INVENTOR
NEVILLE L. DOWNS

BY Charles J. Elderkin
ATTORNEY

INVENTOR
NEVILLE L. DOWNS

BY Charles J. Elderkin
ATTORNEY

United States Patent Office 3,145,338
Patented Aug. 18, 1964

3,145,338
COMBINATION TRANSMISSION SYSTEM PHASE AND IMPEDANCE SENSOR HAVING A SINGLE CENTER-TAPPED PROBE
Neville L. Downs, Madeira Beach, Fla., assignor to Electronic Communications, Inc., St. Petersburg, Fla.
Filed Feb. 3, 1961, Ser. No. 86,964
3 Claims. (Cl. 324—58)

This invention relates to a measuring device and more particularly to a device for measuring the active characteristics of a transmission line.

When alternating current of the higher frequencies is used, it is often necessary to employ some type of a transmission line to convey the energy. Transmission lines presently in use appear in a large variety of forms, such as parallel wires, coaxial cables and waveguides. It is often desirable to measure the active characteristics of the transmission lines, such as the phase angle of the impedance in the line. Measurements of such characteristics have been made successfully in the past but usually required injecting a first probe into the transmission line to obtain an indication of the current and injecting a second probe into the transmission line to obtain an indication of the potential. An electronic circuit connected to these probes can then develop an indication of characteristics such as impedance or phase angle. The main problem encountered with the two probe method of measuring is that of aligning one probe with respect to the other. For example, if the active characteristic being measured is the phase angle, it is determined from the current and potential indication. Ideally, the two indications should be taken from precisely the same location. Since this is impossible, the two probes must be carefully located with respect to one another, and this is a relatively expensive and time consuming procedure.

In many instances, it is necessary to simultaneously measure more than one of the active characteristics of a transmission line. In the past it has been necessary to employ a separate set of probes and associated indicating circuit for each measurement being made. This has led to a relatively large number of probes being injected into the transmission line, thus being relatively expensive and creating considerable disturbance to the line characteristics. Also, since it is desirable to take all measurements from precisely the same spot, the alignment problem is again present.

An object of the present invention is to provide a measuring device of the type described wherein a single probe or sensor can be employed to accomplish a plurality of measurements.

Another object of the present invention is to provide a method for measuring active characteristics of a transmission line requiring only a single probe from which an indication of the current and potential can be determined, thus reducing the number of probes or sensors required and eliminating the alignment problem.

A further object is to provide a circuit capable of giving the indication of more than one of the active characteristics of a transmission line and requiring a minimum number of probes or sensors.

A unique feature of the sensor employed in accordance with this invention is that it is center tapped. When such a sensor is introduced into the electric field of a transmission line, a potential is developed in the sensor which is proportional to the potential in the transmission line. This potential appears between any one of the three leads and ground. In addition to this potential, a second potential is induced by the magnetic field, this second potential appearing as a potential difference between the ends of the sensor. If a current path is provided between any two leads of the sensor, this second potential will cause a current flow which is proportional to the current in the transmission line. Accordingly, it is seen that a center tapped sensor employed in accordance with the invention provides an indication of both the current flow and the potential within the transmission line. These two indications are present in a manner which enables an associated electric circuit to separate the indications and give a useful reading of an active characteristic of the transmission line.

A second feature of the present invention is the unique manner in which a first circuit giving an indication of the phase angle, known as a phase comparator, is combined with a second circuit giving an indication of transmission line impedance, known as a modulus comparator. The phase comparator takes the indications of the current and potential from the probe, vectorially adds them and then rectifies the sum to obtain a direct current indication proportional to the phase angle in the transmission line. The combined modulus comparator is designed to make use of the same transmission line characteristics, i.e., the indications of current and potential in the transmission line. The indication proportional to the current is adjusted to equal the indication proportional to the potential whenever the impedance of the transmission line is equal to the characteristic impedance. Accordingly, by subtracting one indication from the other, a zero output would indicate the equality of the impedances. Indications of impedances other than the characteristic impedance are obtained by noting the deviation of the output of the modulus comparator from the zero value.

In order that the manner in which these and other objects are attained, in accordance with the invention, can be understood in detail, reference is had to the accompanying drawings, which form a part of this specification, and wherein.

Figure 1:
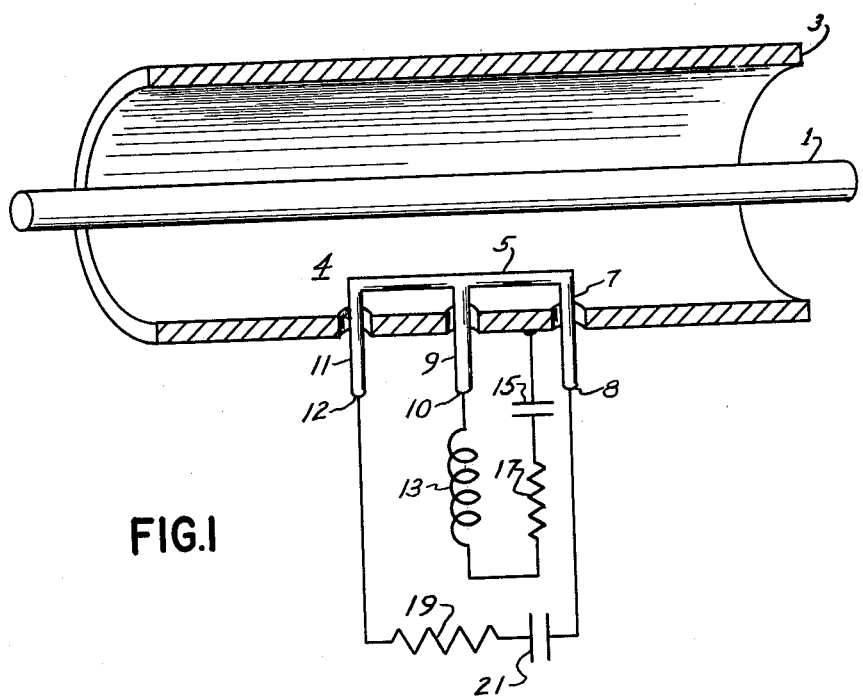
FIG. 1 is a diagrammatic illustration of a sensor according to the present invention in combination with a coaxial transmission line.

The manner in which an indication of the potential and current within a transmission line can be obtained by a single probe or sensor in accordance with the invention is best described in connection with FIG. 1. Here, a sensor 4 is shown disposed within a coaxial line having a central conductor 1 and a surrounding concentric conductor 3. The sensor comprises a main leg 5, a first outer leg 7, a second outer leg 11, and a center leg 9, leg 5 extending axially of the transmission line and legs 7, 9 and 11 projecting laterally of the transmission line. While the sensor construction shown is advantageous, other configurations can be employed so long as a center tapped loop is provided. Thus, it is also possible to employ two rounded loops with a common center connection.

A potential proportional to the potential within the transmission line is induced in the sensor 4 by the electric field within the transmission line. Whenever energy passes through a transmission line an electric field is developed which, in a coaxial transmission line, is concentric with the center conductor. If a conductor such as the sensor 4 is placed within this electric field, a potential is induced in the conductor. The potential so induced is directly proportional to the potential between the center conductor and the concentric conductor at the point at which the sensor is placed. Accordingly, a potential is developed in the sensor 4 which is proportional to the potential between the center conductor 1 and the concentric conductor 3. This induced voltage appears as a potential which is the same with respect to ground on each of the three terminals 8, 10 and 12 of the sensor. An indication of the value of this potential can be obtained by connecting a circuit between the center terminal 10 and the concentric conductor 3 which is normally at ground potential. Such a circuit is shown as including the inductor 13, capacitor 15 and resistor 17. An appropriate indicating instrument can be connected across the resistor 17 to obtain an indication of the potential existing between the central conductor 1 and the concentric conductor 3.

The magnetic field in the transmission line induces a second potential in the sensor by mutual inductance. This potential is proportional to the current flow in the transmission line and differs from the potential induced by the electric field in that it appears as a potential difference between the ends of the sensor instead of a potential with respect to ground. The potential in the sensor 4 which is proportional to current can be measured by providing a current path between the terminals 8 and 12. Such a circuit can, for example, be formed by the series combination of resistor 19 and capacitor 21. An indication of the magnitude of the current flow in the transmission line can thus be obtained by connecting a voltage indicating instrument across resistor 19. It should be noted that the potential induced in sensor 4 by the electric field in the line cannot cause current flow through resistor 19 because this potential is the same at terminal 12 as it is at terminal 8. It should also be noted that the current induced in the sensor 4 by the magnetic field does not flow through the resistor 17, since there is no complete current path from the terminal 10 to either terminal 8 or terminal 12. It is seen, therefore, that a single probe can be employed in accordance with FIG. 1 to obtain an indication of both the current flow within a transmission line and the potential between conductors of the transmission line.

Figure 2:
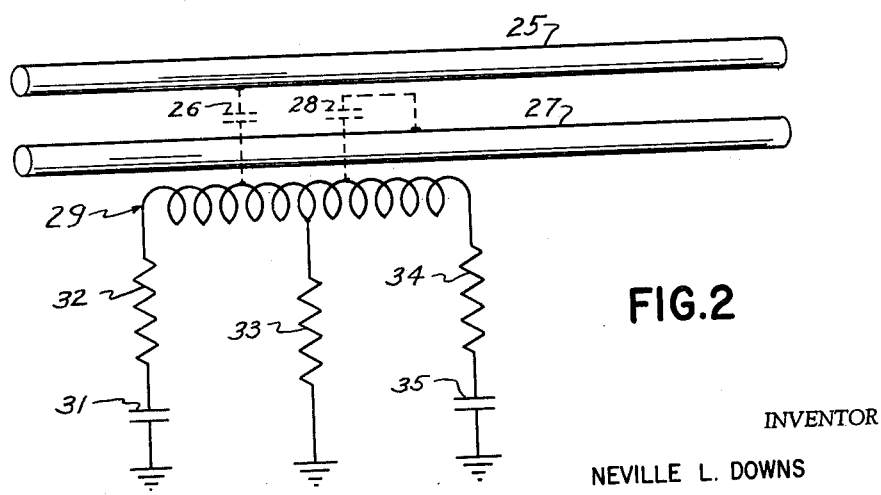
FIG. 2 is a diagrammatic illustration of another sensor according to the invention in combination with a parallel wire transmission line.

FIG. 2 shows a second embodiment of a sensor according to the present invention, employed in combination with a parallel wire type transmission line including conductors 25 and 27. The sensor loop consists of a center tapped coil 29 which is placed within the electric and magnetic fields of the transmission line. The conductors 25 and 27 of the transmission line may be considered as a single loop primary of a transformer in which the coil 29 acts as the secondary. Current flow in the conductors 25 and 27 creates a changing magnetic field which cuts the turns of the coil 29, thus inducing a potential difference in the coil 29 proportional to current in the transmission line. A loop in which the current caused by this potential difference can flow is completed through resistor 32, capacitors 31 and 35 and resistor 34. Current flows from one end of coil 29 through resistor 32, capacitor 31, the common ground connection, capacitor 35 and resistor 34, back to the other end of the coil 29. If the circuit is balanced, i.e., if capacitor 31 is of the same value as capacitor 35, resistor 32 is the same as resistor 34 and the coil 29 is center tapped, then no current flows through the resistor 33. Any tendency for current to flow through the resistor 34, the capacitor 35, the common ground connection and through the resistor 33 would be opposed by a tendency for current to flow in the opposite direction through the resistor 33, the common ground connection, the capacitor 31 and resistor 32.

A second potential is induced in coil 29 by the electric field. The conductor 25 can be considered as one plate of a capacitor 26, with coil 29 acting as the other plate. Similarly, the conductor 27 can be considered as one plate of a capacitor 28, with coil 29 acting as the other plate. So long as the coil 29 is not placed on the zero potential plane between the conductors 25 and 27, the coil is maintained at a potential proportional to that between the conductors 25 and 27. This potential in the coil 29 is established by the voltage divider effect of the capacitors 26 and 28 and maintained by energy passing through the electric field. The potential on the coil 29 is the same on all three leads and can be measured across the resistor 33 connected between one of the leads and ground.

The embodiments of the present invention illustrated in FIGS. 1 and 2 by no means exhaust the range of possible structures embraced by the generic scope of the invention. As previously pointed out, the sensor loops could be of virtually any configuration, so long as the sensor is center tapped. The size and shape of the loop employed depends largely on the size and type of the transmission line with which it is employed. The two embodiments shown, however, illustrate the principle of the invention and are sufficient to enable those skilled in the art to construct sensors according to this invention which can be employed with any of the various types of transmission lines.

Figure 3:
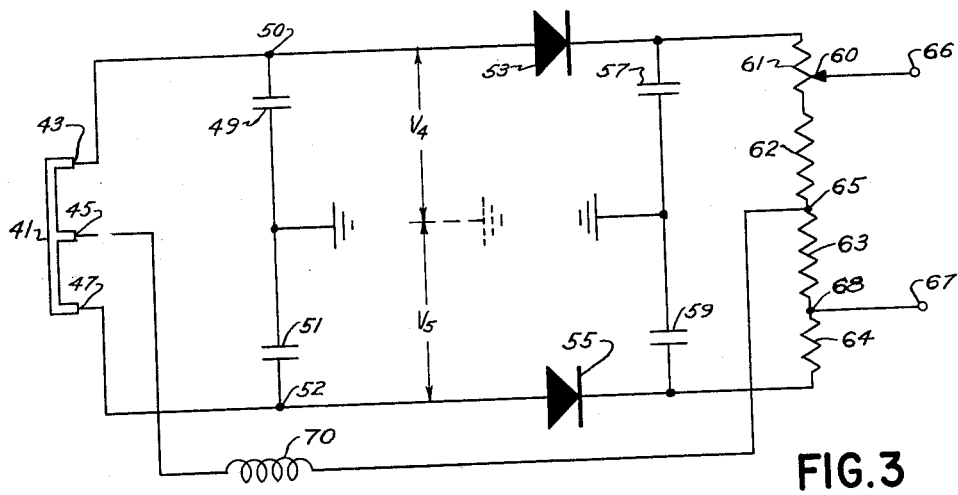
FIG. 3 is a circuit diagram of a phase comparator in combination with a sensor in accordance with the invention.

FIG. 3 shows a phase comparator which is capable of giving a direct current indication corresponding to the value of the phase angle within a transmission line. This phase comparator employs a sensor of the type described in connection with FIGS. 1 and 2, the sensor being shown diagrammatically in FIG. 3. Induced in the sensor 41 is a first potential which is equal on all of the leads 43, 45 and 47 and is proportional to the potential within the transmission line. Since this potential is induced in the sensor 41 by the electric field within the transmission line, this potential is referred to as $V_e$. A second potential is induced in the sensor 41 and appears as a potential difference between any two of the leads 43, 45 and 47, being proportional to the current flow within the transmission line. This potential is induced in the sensor 41 by the magnetic field of the transmission line and is therefore referred to as $V_m$.

The potential $V_e$ appearing at leads 43, 45 and 47 is established by the capacitive voltage divider including the capacitance between the sensor and conductors of the transmission line and capacitors 49 and 51. The potential produced by the capacitive divider at point 50 is rectified in diode 53, thus permitting a direct current to flow through resistor 61, resistor 62 and inductor 70 to lead 45. Similarly, the potential appearing at point 52 is rectified in diode 55 permitting a direct current flow through resistor 64, resistor 63 and inductor 70 to lead 45. Inductor 70 prevents R.F. current flow in resistors 61, 62, 63 and 64 while providing a path for the direct current passing through diodes 53 and 55. Thus, a potential referred to as $V_1$, proportional to the potential within the transmission line, is established at points 50 and 52.

The potential $V_m$ is present between leads 43 and 47 of the sensor 41. This potential is proportional to the current flow within the transmission line and, since it is induced through the magnetic field, is 180° out of phase with the current flow within the transmission line. Potential $V_m$ causes current flow from the lead 47 through a capacitor 51, a capacitor 49 and back to the lead 43. Since capacitors are very nearly purely reactive, the potential developed across the capacitors 49 and 51 is approximately 90° out of phase with respect to the current passing therethrough. Furthermore, since each of the capacitors 49 and 51 has one plate connected to ground, the potential developed at point 50 is 180° out of phase with the potential developed at point 52. Therefore, if the potential in the transmission line is in-phase with the current in the transmission line, then the potentials at points 50 and 52, produced by the potential $V_m$, are plus and minus 90° out of phase with respect to the potentials produced at the same terminals by the voltage $V_e$. This in-phase condition is shown in the vector diagram of FIG. 4a. As previously pointed out, the potential $V_1$ is the potential produced at points 50 and 52 by the potential $V_e$. The potential appearing across capacitor 49 is represented vectorially as the potential $V_2$ and the potential appearing across the capacitor 51 is represented vectorially as the potential $V_3$. $V_2$ is 180° out of phase with respect to $V_3$ and $V_2$ and $V_3$ are each 90° out of phase with respect to $V_1$. The vectorial summation of the potential $V_1$ and $V_2$ is $V_4$. Similarly, the vectorial summation of $V_1$ and $V_3$ is $V_5$. As shown in FIG. 3, the potential $V_4$ appears across the diode 53 and the potential $V_5$ appears across the diode 55.

The diode 53 rectifies the alternating current potential $V_4$ to obtain a direct current potential proportional to the magnitude without regard to phase. This direct current potential is impressed across the resistors 61 and 62. The unwanted alternating current ripple is bypassed to ground through the capacitor 57. The potential $V_5$ is similarly rectified by the diode 55 to obtain a direct current potential, proportional to magnitude, which is impressed across the resistors 63 and 64. The unwanted alternating current ripple passing through diode 55 is bypassed to ground through the capacitor 59.

Figure 4A:
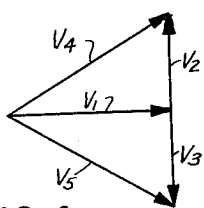
FIGS. 4a–4c are diagrams showing the vectorial summation of potentials occurring in the phase comparator circuit of FIG. 3.

As previously pointed out, if the current in the transmission line is in-phase with the potential in the transmission line, the potentials appearing at points 50 and 52 of FIG. 3 are as shown vectorially in FIG. 4a. Under these conditions the magnitude of the potential $V_4$ is equal to the magnitude of the potential $V_5$. Since these vectors are equal in magnitude, the direct current potential which appears between center tap 69 and the point 65 is equal to the potential appearing between the points 68 and 65. Accordingly, the potential difference between the terminal 66 and the terminal 67 is zero, thus indicating the in-phase condition within the transmission line.

Figure 4B:
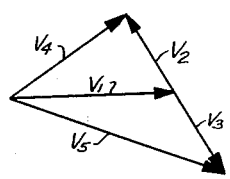

If the condition within the transmission line is capacitive, i.e., the current leading the potential, then the potentials at points 50 and 52 of FIG. 3 are as shown in FIG. 4b. The change of phase relationship within the transmission line changes the phase relationship of the potentials $V_2$ and $V_3$ with respect to $V_1$. Accordingly, the vectorial potential $V_4$ has a smaller absolute magnitude than does the potential $V_5$. Accordingly, the diode 55 of FIG. 3 which rectifies the potential $V_5$ produces a larger potential between the points 68 and 65 than does the diode 53 between the points 60 and 65. Since the potential at point 68 is larger with respect to point 65 than the potential at point 60, the terminal 67 has a positive potential with respect to terminal 66. This potential indicates the magnitude of the leading phase angle within the transmission line.

Figure 4C:
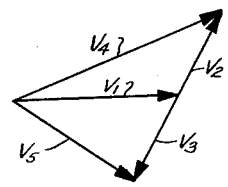

If the condition within the transmission line is inductive, i.e., the current lagging the voltage, then the potentials appearing at points 50 and 52 of FIG. 3 are as shown in FIG. 4c. Under these conditions the vectorial voltages $V_2$ and $V_3$ have shifted, making the vectorial potential $V_4$ larger than the vectorial potential $V_5$. Accordingly, the potential at point 60 with respect to point 65 in FIG. 3 is larger than the potential at point 68 with respect to point 65. Accordingly, the potential at terminal 66 is positive with respect to the potential at terminal 67. The positive potential at terminal 66 therefore indicates the lagging phase condition within the transmission line.

The circuitry and the operation of a phase comparator employing the new and unique sensor 41 according to this invention is illustrated in FIGURES 3 and 4a–4c. This comparator indicates an in-phase condition within the transmission line by a zero potential between terminals 66 and 67. When terminal 67 is positive with respect to terminal 66, it indicates that the current within the transmission line leads the potential and the magnitude of the potential between terminals 67 and 66 indicates the magnitude of the phase angle. When terminal 66 is positive with respect to terminal 67, it indicates that the current in the transmission line lags the potential and the magnitude of the potential between terminals 66 and 67 indicates the magnitude of the lagging phase angle.

Figure 5:
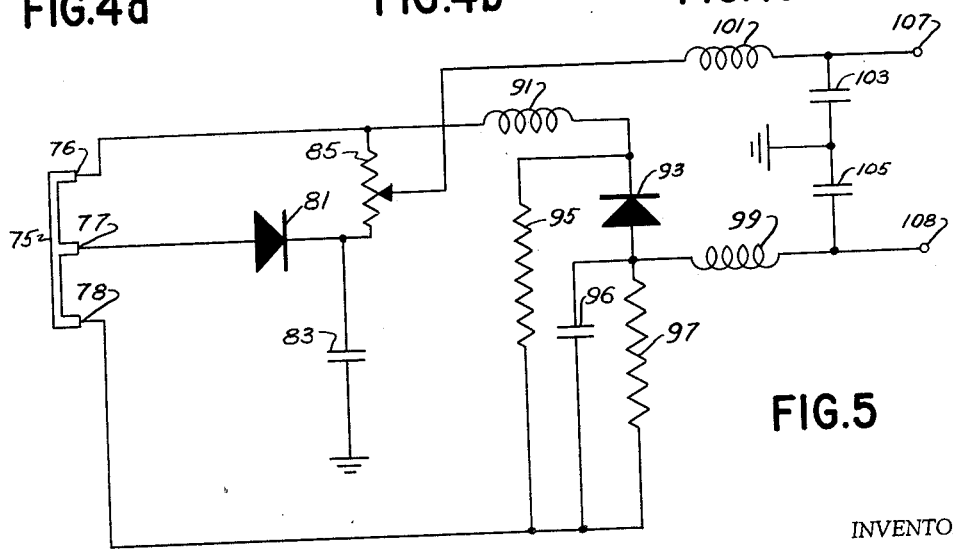
FIG. 5 is a circuit diagram of a modulus comparator in combination with a sensor in accordance with the invention.

FIG. 5 shows a modulus comparator circuit, in combination with the unique sensor according to this invention, operative to indicate the impedance of the transmission line. For most purposes, it is not necessary to know the exact impedance value but rather the relation between the actual impedance and the characteristic impedance of the transmission line. Since an indication of the potential and the current within the transmission line is present within the sensor 75, it is possible to derive an indication of the impedance because of the well-known Ohm's law relationship $$Z = \frac{E}{I}$$

Since the exact value of Z is not of as much interest as knowing whether Z is equal to the characteristic impedance $Z_0$ or the deviation therefrom, a simplified method of indicating the impedance is available. This is accomplished by adjusting the indication which is proportional to the potential within the transmission line to equal the indication proportional to the current within the transmission line whenever the impedance in the transmission line is equal to the characteristic impedance. Then, by subtracting one potential indication from the other, a zero potential indicates the impedance of the transmission line is equal to the characteristic impedance. Whenever these two potentials are of different values, the subtraction of these potentials will not result in a zero output and thereby indicates that the transmission line impedance is other than the characteristic impedance.

The circuit which accomplishes the impedance comparison is the modulus comparator circuit shown in FIG. 5. The sensor 75 has a potential appearing at lead 77 which is proportional to the potential within the transmission line and is the potential previously referred to as $V_e$. This potential causes current flow through variable resistor 85 and diode 81 and therefore establishes a D.C. potential across resistor 85 proportional to the potential within the transmission line. The capacitor 83 bypasses the alternating current components of the rectified potential, thus acting as a filter capacitor. The potential appearing at the center tap of the variable resistor 85 is further filtered in the inductor 101 and the capacitor 103, thus providing a smooth direct current potential at terminal 107 proportional to the potential within the transmission line.

The alternating current potential which appears between leads 76 and 78 of the sensor 75 is the potential previously referred to as $V_m$ and is proportional to the current flow within the transmission line. The potential $V_m$ causes current to flow from the lead 78 through the resistor 97, the diode 93 and the inductor 91 back to the lead 76. The diode 93 rectifies the alternating current potential appearing between leads 76 and 78 and develops a direct current potential across the resistor 97 which is proportional to the current flow within the transmission line. The capacitor 96 bypasses the alternating current ripple components of the rectified voltage. It has been observed that a change of frequency within the transmission line affects the potential $V_m$ but not the potential $V_e$. In order to maintain the relationship between these two potentials regardless of frequency, it is necessary to compensate for this effect. Such compensation is accomplished by means of the inductor 91 and the resistor 95 which provide an alternating current path bypassing the diode 93. As frequency increases, the impedance of inductor 91 increases. Since the inductor 91 is in voltage divider relationship with the diode 93 and the resistor 97, an increased portion of the potential appearing between the leads 76 and 78 is dropped across inductor 91 as the frequency increases. Accordingly, as the frequency increases, the portion of the potential $V_m$ appearing across the diode 93 and the resistor 97 decreases, thus compensating for the increase of the potential $V_m$ with frequency. The potential appearing across the resistor 97 is proportional to the current flow within the transmission line. It is further filtered by the inductor 99 and the capacitor 105 and appears at terminal 108 as a smooth direct current proportional to the current flow within the transmission line.

By adjusting the variable resistor 85, the potential appearing at the terminal 107 can be made equal to the potential appearing at the terminal 108 whenever impedance of the transmission line is equal to the characteristic impedance. Under these conditions, there is no potential difference between the terminals 107 and 108, thus indicating the desired condition. If the impedance of the transmission line is other than the characteristic impedance, the equality between the potential at the terminal 107 and that at terminal 108 is disturbed and a potential difference will exist. This potential difference is proportional to the deviation from the characteristic impedance and thereby serves to indicate the deviation of the transmission line impedance from the characteristic impedance.

Figure 6:
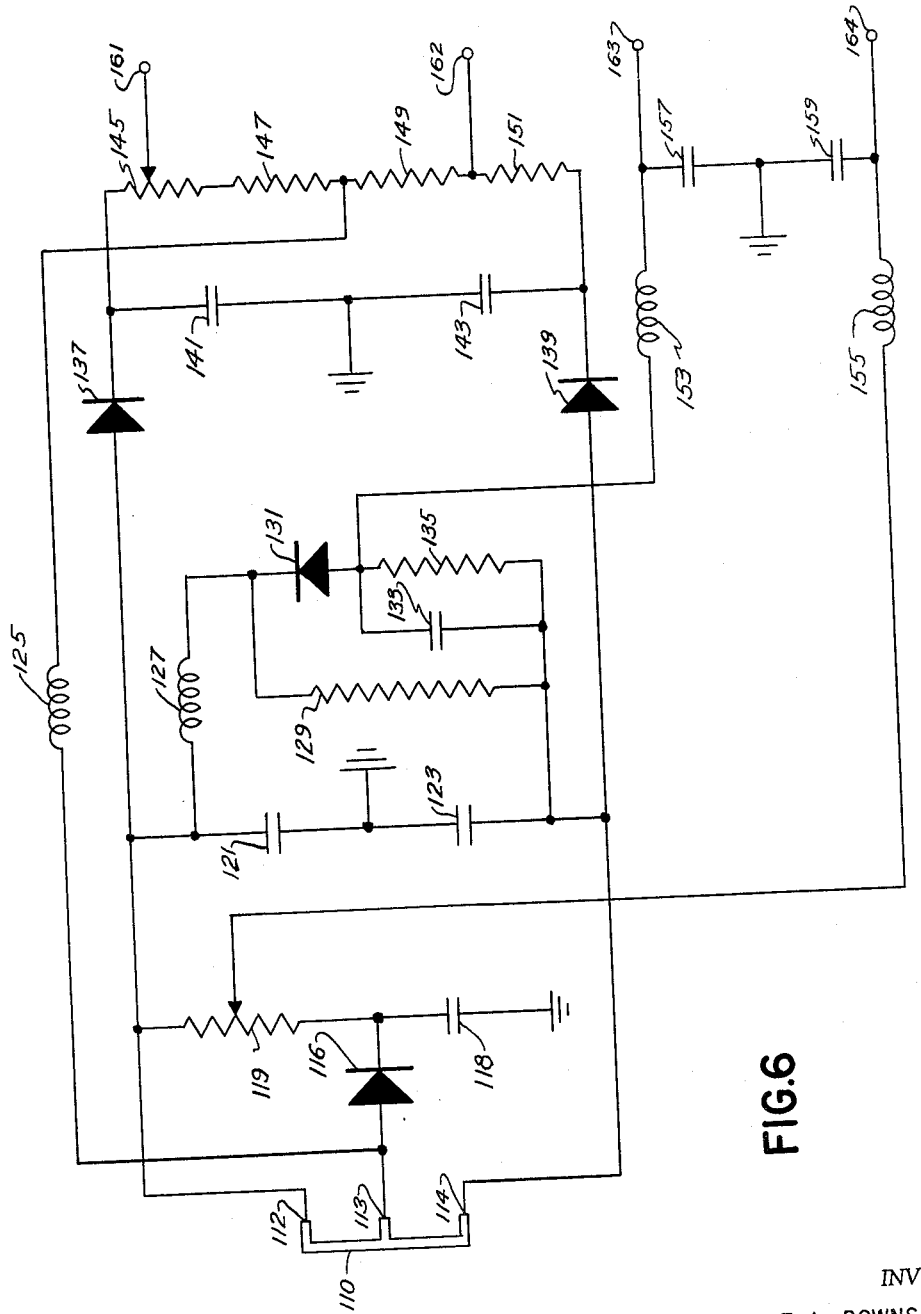
FIG. 6 is a circuit diagram of a duplexed comparator in combination with a sensor.

FIG. 6 illustrates a circuit utilizing a single center tapped sensor in accordance with the invention in such fashion as to give indications of both the phase angle within the transmission line and the impedance within the transmission line. The sensor 110 is shown diagrammatically and includes leads 112, 113 and 114. This sensor has a potential $V_e$ appearing at leads 112, 113 and 114 which is proportional to the potential within the transmission line. The sensor 110 also has a potential difference $V_m$ which exists between the leads 112 and 114 and is proportional to the current flow within the transmission line. These potentials, i.e., $V_m$ and $V_e$, are utilized by the associated circuit to produce an indication of the phase angle within the transmission line at the terminals 161 and 162 and to give an indication of the impedance within the transmission line at the terminals 163 and 164.

The portion of the circuit which obtains the phase angle indication operates in a manner similar to that of the circuit shown in FIG. 3. The potential $V_m$ appearing between leads 112 and 114 causes current to flow through capacitors 121 and 123, while the potential $V_e$ appearing at leads 112, 113 and 114 causes current flow through diode 137, resistor 145, resistor 147 and inductor 125 to lead 113 and through diode 139, resistor 151, resistor 149, and inductor 125 to lead 113. The current flow caused by the potentials $V_m$ and $V_e$ create potentials appearing across the diodes 137 and 139 and having the vectorial relationship shown in FIGS. 4a–4c. The direct current potentials produced by the diodes 137 and 139 appear across the resistors 145, 147, 149 and 151 with capacitors 141 and 143 acting to filter out the ripples. If the phase angle within the transmission line is zero, there is no potential difference between the terminals 161 and 162. However, if the current within the transmission line leads the potential, the potential across the diode 137 is then larger than the potential across diode 139, thus resulting in a potential difference at terminals 161 and 162 with terminal 161 being positive with respect to terminal 162. If the current in the transmission line lags the voltage, the potential across the diode 139 is larger than that across the diode 137, resulting in a potential difference between terminals 161 and 162 with terminal 162 being positive. Accordingly, this portion of the circuit gives an indication of the phase angle within the transmission line appearing as a direct current potential between the terminals 161 and 162.

The portion of the circuit which indicates the impedance within the transmission line is similar to that shown in FIG. 5. The potential $V_e$ appearing at lead 113 is rectified by the diode 115 and develops a direct current potential across variable resistor 119 which is proportional to the potential difference within the transmission line. The potential $V_m$ appearing between leads 112 and 114 causes current to flow through the resistor 135, the diode 131 and the inductor 127, developing a potential across the resistor 135 which is proportional to the current flow within the transmission line. The capacitors 118 and 133 bypass ripple components around their respective resistors 119 and 135. The resistor 129, in combination with inductor 127, compensates for the effect that a change in transmission line frequency would otherwise have on the potential developed across resistor 135. The inductors 153 and 155 and capacitors 157 and 159 further filter the ripple components from the potential across their respective resistors 119 and 135. The variable resistor 119 is adjusted so that the potential at terminal 163 equals the potential at terminal 164 whenever the impedance of the transmission line equals the characteristic impedance. Whenever these impedances are equal, there is no potential difference between the terminal 163 and the terminal 164. Any inequality of these impedances produces a potential between the terminals 163 and 164, the magnitude of which is proportional to the deviation of the transmission line impedance from the characteristic impedance. Accordingly, it is seen that the potential between terminals 163 and 164 gives an indication of the impedance within the transmission line.

In the foregoing specification a new and unique sensor for use in combination with transmission lines has been disclosed which is capable of giving indications of a number of the active characteristics of the associated transmission line. Also included are several examples in which the new sensor can be used in accordance with the invention, and particularly a use of the novel sensor in combination with a circuit which gives a plurality of indications of the active characteristics of the transmission line.

What is claimed is:

1. In a device for measuring more than one active characteristic of a transmission line, the combination of sensor means defining two sensor loops having a common center leg, said sensor means being constructed and arranged for operative association with a transmission line and having first and second leads connected each to a different one of the outer legs of said sensor means and a third lead connected to said center leg, first circuit means connected to said third lead to derive an electrical quantity proportional to the potential within the transmission line, second electrical circuit means connected between said first and said second leads to derive an electrical quantity proportional to the current flow within the transmission line, third circuit means connected to said first circuit means and said second circuit means to derive an electrical quantity related to the impedance within the transmission line, first rectifying means connected to said first lead, second rectifying means connected to said second lead, fourth circuit means connected between said first lead and said second lead to provide an electrical quantity across said first and second rectifying means which is proportional in phase and magnitude to the current within the transmission line, fifth circuit means connected to said third lead for providing an electrical quantity across said first and second rectifying means which is proportional in phase and magnitude to the potential within the transmission line, and sixth circuit means connected to said first and said second rectifying means for deriving an electrical quantity related to the phase angle between the current and potential within the transmission line.

2. In a device for measuring an active characteristic of a transmission line, the combination of sensor means defining two sensor loops having a common center leg and two outer legs, said sensor means being arranged for operative association with a transmission line, first circuit means connected to said common leg and operative to derive from said sensor means an electrical quantity related to the potential within the transmission line, second circuit means connected between said outer legs and operative to derive from said sensor means an electrical quantity related to the current within the transmission line, said second circuit means including a serially connected inductance therein to compensate for increases of potential due to increase in frequency, and comparing means connected to said first and second circuit means to compare said derived electrical quantities and to derive from said comparison an electrical quantity proportional to the absolute magnitude of the impedance within the transmission line.

3. In a device for measuring more than one active characteristic of a transmission line, the combination of a center tapped sensor means, a center lead and two outer leads, first and second circuit means connected between said outer leads and each deriving an electrical quantity proportional to the current and frequency within the transmission line, third and fourth circuit means connected to said center lead and each deriving an electrical quantity proportional to the potential within the transmission line, fifth circuit means connected to said first and third circuit means to derive an electrical quantity whose polarity is directly related to the phase angle between the current and potential within the transmission line, and sixth circuit means connected to said second and fourth circuit means to derive an electrical quantity proportional to the impedance within the transmission line.

References Cited in the file of this patent

UNITED STATES PATENTS

| | | |
|---|---|---|
| 2,554,196 | Krause | May 22, 1951 |
| 2,676,299 | Leavitt et al. | Apr. 20, 1954 |
| 2,808,566 | Douma | Oct. 1, 1957 |
| 2,851,662 | True et al. | Sept. 9, 1958 |
| 2,961,605 | Broadhead | Nov. 22, 1960 |